United States Patent Office 3,539,636
Patented Nov. 10, 1970

3,539,636
HEAT- AND LIGHT-STABILIZED MOLDING COMPOSITION BASED ON VINYL CHLORIDE POLYMERS CONTAINING ORGANOTIN STABILIZERS AND PROCESS FOR MAKING SAID STABILIZERS
Christoph Dorfelt, Burghausen (Salzach), and Hans-Joachim Andraschek, Burgkirchen (Alz), Germany, assignors to Farbwerke Hoechst Aktiengesellschaft vormals Meister Lucius & Bruning, Frankfurt am Main, Germany, a corporation of Germany
No Drawing. Filed June 14, 1967, Ser. No. 645,879
Claims priority, application Germany, June 15, 1966,
F 49,468
Int. Cl. C08f 45/62, 45/58, 45/60
U.S. Cl. 260—23                                     7 Claims

ABSTRACT OF THE DISCLOSURE

The invention relates to a molding composition stabilized against heat and light on the basis of polymers of vinyl chloride, containing 0.05 to 5 percent by weight of a mixture of:

(a) a sulfur-containing organotin compound of the formula $(RSnS_{1.5})n$ and
(b) the anhydride of a sulfur-free stannonic acid of the formula

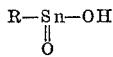

with a mono- or polycarboxylic acid having 1 to 20 carbon atoms, wherein R is an aliphatic, cycloaliphatic, araliphatic or aromatic hydrocarbon having 1–20 carbon atoms, and $n$ is a whole number of 2–8.

The stabilizing mixtures are prepared by reacting organotin trihalides of the formula $RSnHal_3$ with a mixture of an alkali metal sulfide and an alkali metal mono- or poly-carboxylate in the presence of 2 moles of alkali hydroxide per mole of carboxylate.

The present invention relates to a heat- and light-stabilized molding composition based on vinyl chloride polymers containing organotin stabilizers and a process for making said stabilizers.

It has already been proposed to stabilize homo- and co-polymers of vinyl chloride against the action of light and heat by adding small amounts of organotin compounds. This stabilization is important particularly in view of the high temperatures required for processing these polymers and plays a special role in the manufacture of crystal clear sheets and films. Effective stabilizers are sulfur-containing organotin compounds, for example dialkyltin derivatives of thioglycollic acid esters, which have also been used in industry.

To the sulfur-containing organotin stabilizers there belong also thiostannonic acids which have recently become known and have been described in German Pats. Nos. 1,078,772 and 1,160,177. They are obtained by reacting organotin trihalides of the general formula $R \cdot SnX_3$ in which R is an organic radical and X is a halogen atom, with alkali metal sulfides, and have a considerably improved stabilizing action as compared with thioglycollic acid derivatives. They are physiologically harmless and may therefore also be used for shaped articles of polyvinyl chloride which come into contact with foodstuffs, particularly for packaging films for foodstuffs.

The present invention provides further valuable, physiologically harmless organotin stabilizers for polyvinyl chloride which are even more effective than the thioglycollic acid derivatives and thiostannonic acids.

The present invention therefore provides a heat- and light-stabilized molding composition based on homo- or co-polymers of vinyl chloride containing an organotin compound which contains, as a stabilizer, 0.05 to 5% by weight, advantageously 0.2 to 2% by weight, calculated on the total molding composition, of a mixture consisting of (a) a sulfur-containing organotin compound of the formula $(RSnS_{1.5})_n$ in which R stands for an aliphatic, cycloaliphatic, araliphatic or aromatic hydrocarbon radical with 1 to 20 carbon atoms, advantageously an aliphatic hydrocarbon radical with 1 to 8 carbon atoms, preferably the butyl radical, and in which $n$ is an integer within the range of from 2 to 8, advantageously 2 to 5, preferably 3 or 4, and (b) an anhydride free from sulfur of stannonic acids, of the following formula

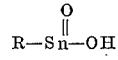

in which R has the meanings given above, with mono- or poly-carboxylic acids having 1 to 20 carbon atoms, the weight ratio of sulfur-containing component (a) to component (b) free from sulfur being within the range of 1:10 to 10:1.

The present invention further provides a process for the manufacture of the stabilizer mixtures to be used as a component of the above molding compositions, which comprises reacting organotin halides of the formula $RSnHal_3$ in which R stands for an aliphatic, cycloaliphatic, araliphatic or aromatic hydrocarbon radical with 1 to 20 carbon atoms, advantageously an aliphatic hydrocarbon radical with 1 to 8 carbon atoms, preferably the butyl radical, with an equivalent amount, calculated on the halogen, of the mixture of an alkali metal sulfide, an alkali metal salt of a mono- or poly-carboxylic acid with 1 to 20 carbon atoms and an alkali metal hydroxide, while using 2 moles of alkali metal hydroxide for each mole of carboxyl group.

In the process of the invention, a part of the organotin trihalide, advantageously organotin trichloride, is reacted in known manner with the alkali metal sulfide to thiostannonic acid, while the other part of the organotin trihalide is reacted with the alkali metal carboxylate or polycarboxylate and the alkali metal hydroxide to yield a mono-organotin derivative of the corresponding carboxylic acid according to the following reaction scheme:

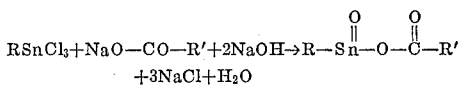

in which R' stands for the organic radical of the carboxylic acid.

In the process of the invention there may be used ali-example, acetic acid, acrylic acid, methacrylic acid, cro-example, actic acid, acrylic acid, methacrylic acid, crotonic acid, levulinic acid, sorbic acid, 2-ethylhexylic acid, lauric acid, stearic acid, oleic acid, hydroxystearic acid, ricinoleic acid or fatty acid of linseed oil, or aromatic mono-carboxylic acids, for example, benzoic acid, salicylic acid or anthranilic acid. It is also possible to use dicarboxylic acids of the aliphatic, cycloaliphatic or aromatic series with advantageously 2 to 10 carbon atoms, for example, oxalic acid, malonic acid, succinic acid, maleic acid, glutaric acid, adipic acid, sebacic acid, phthalic acid, terephthalic acid, or polycarboxylic acids such as citric acid or pyromellitic acid.

In the case of di- or poly-carboxylic acids there are also used 2 moles of alkali metal hydroxide for each carboxyl group. For example, the reaction of butyltin trichloride with sodium adipinate and sodium hydroxide takes place according to the following reaction scheme:

$$2C_4H_9SnCl_3 + NaO-CO-(CH_2)_4-CO-ONa + 4NaOH \longrightarrow$$

$$C_4H_9-\overset{O}{\underset{\|}{S}}n-O-CO-(CH_2)_4-CO-O-\overset{O}{\underset{\|}{S}}n-C_4H_9 + 6NaCl + 2H_2O$$

Accordingly, the reaction product of, for example, butyltin trichloride, sodium citrate and sodium hydroxide corresponds to the following formula

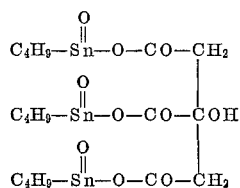

In the process of the invention there may be used organotin trihalides, advantageously chlorides, with aliphatic, cycloaliphatic, araliphatic or aromatic radicals with up to 20 carbon atoms. Examples of such compounds are methyltin trichloride, ethyltin trichloride, butyltin trichloride, hexyltin trichloride, octyltin trichloride, phenyltin trichloride, tolyltin trichloride, benzyltin trichloride or cyclohexyltin trichloride. The best stabilizers are obtained on the basis of organotin trichlorides carrying aliphatic groups as substituents, preferably butyltin trichloride. Instead of trichlorides, it is possible to use the analogous tribromides or triiodides. For reasons of economy it is preferable to use the chlorides.

As alkali metal sulfide it is advantageous to use sodium sulfide. Potassium sulfide or the sulfides of other alkali metals or alkaline earth metals are, in principle, also suitable but their use is uneconomical or they are more difficultly accessible. The reaction in accordance with the invention is generally carried out using the sodium salts of carboxylic acids. When long-chain fatty acids, for example, oleic acid or stearic acid, are used, it has proved more advantageous in special cases to use potassium salts which are more easily soluble in water.

The reaction in accordance with the invention is advantageously carried out in an aqueous solution. The aqueous solution of a mixture of alkali metal sulfide, alkali metal carboxylate and alkali metal hydroxide is, for example, placed in a reaction vessel and the aqueous solution of the organotin trihalide is then run in or vice versa. The stabilizer mixture obtained as the reaction product in accordance with the invention precipitates in the form of a white powder insoluble in water, with slightly rising temperature. Stirring is continued for some time at an elevated temperature of about 40° C. to 100° C., the product is then suction-filtered, washed with water until free from salt and dried in known manner.

The improved stabilizing effect of the products in accordance with the invention, as compared with organotin derivatives of thioglycollic acid esters and thiostannonic acids, was surprising and could not be foreseen. The improved stabilizing effect is probably due to a synergism between thiostannonic acids and organotin carboxylic acid derivatives. When the two components are made separately and then mixed, the stabilizing effect is also improved but is generally inferior to that of the products obtained by a common reaction.

The weight ratio of thio-derivative to carboxylic acid derivative may be varied and thus adjusted to the nature of the polymer to be stabilized and the type of processing machine used, for example, a calender or an extruder. The mixtures may contain 10 to 90% carboxylic acid derivative. The organotin stabilizers in accordance with the invention may be used either alone or in combination with known organotin or other stabilizing agents, for example epoxides, and also together with antioxidants, gelatinizing agents, UV rays absorbing agents, light protecting agents, plasticizers, lubricants, fillers, dyestuffs and substances having an antistatic effect.

As antioxidants there may advantageously be used antioxidants based on phosphites, for example, triphenyl phosphite, tridecyl phosphite or tri-p-nonylphenyl phosphite; antioxidants based on substituted phenols, for example, butoxy anisol, bis-p-oxyphenyl methane or di-tert. butyl-p-cresol; antioxidants based on alkyl thioethers, for example, di-stearyl thiodipropionate or di-lauryl thiodipropionate.

The stabilizers in accordance with the invention may be used for stabilizing homo- or copolymers of vinyl chloride or mixtures containing predominantly polymers containing vinyl chloride.

As hetero components for the copolymers of vinyl chloride there may be used vinyl acetate, vinylidene chloride, vinyl stearate, acrylic acid esters, maleic acid esters or mixtures of these monomers.

The mixtures based on polymers containing vinyl chloride may contain as further components, for example, synthetic rubber (copolymer of butadiene with styrene or acrylonitrile), chlorinated or sulfo-chlorinated polyolefins or their mixtures.

The following examples serve to illustrate the invention, but are not intended to limit it, the parts being by weight.

EXAMPLE 1

Reaction of butyltin trichloride with sodium sulfide, sodium levulinate and sodium hydroxide (aqueous solution)

Reaction schemes:

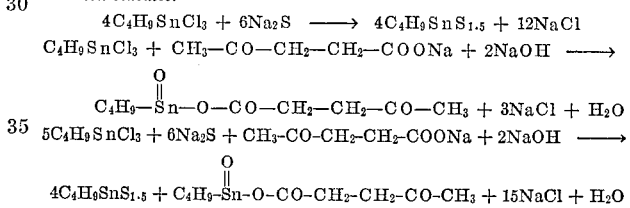

In a glass flask, 23.2 grams of levulinic acid (0.2 mole) were introduced, while stirring, into 600 cc. of normal sodium hydroxide solution (0.6 mole), the levulinic acid dissolving with formation of sodium levulinate. 288 grams of $Na_2S \cdot 9H_2O$ (1.2 moles) and 320 cc. of water were then added while stirring continuously. To the clear solution so obtained there was added a solution of 282.2 grams of butyltin trichloride (1 mole) in 800 cc. of water. The temperature rose from 25 to 380° C. and the reaction product precipitated in the form of a white powder. Stirring was continued for some time at about 40° C. The product was then suction-filtered, washed with water until free from sodium chloride and dried.

Yield: 232.2 grams = 96.7% of the theoretical.

*Analysis.*—Calculated (percent): Sn, 49.4; S, 16.0. Found (percent): Sn, 50.2; S, 16.2.

The ratio of sulfur-containing stabilizer component to stabilizer component free from sulfur in the mixture so obtained was 2.9:1.

EXAMPLE 2

Reaction of butyltin trichloride with sodium sulfide, sodium adipinate and sodium hydroxide solution Reaction schemes:

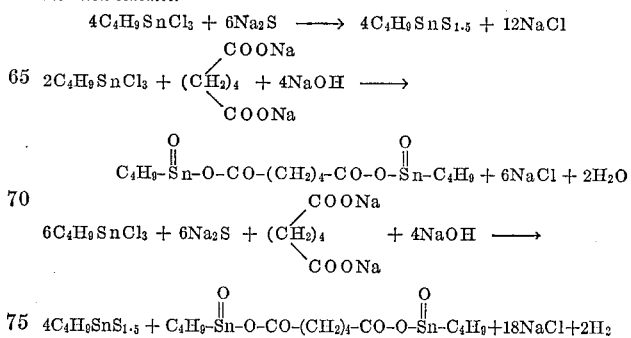

In an enamelled steel vessel provided with an anchor agitato, 5.28 kilograms of a 50% sodium hydroxide solution (66 moles) were stirred with 13 liters of water. 1606 grams adipic acid (11 moles) and a solution of 15.84 kilograms of $Na_2S \cdot 9H_2O$ (66 moles) in 22 liters of water were added, while stirring. Into the clear solution so obtained a solution of 18.63 kilograms of butyltin trichloride (66 moles) in 7.5 liters of water was run while stirring continuously. The temperature rose gradually from 20 to 34° C. and the mixture of the organotin compounds formed in the course of the reaction precipitated in the form of a white powder. Stirring was continued for 1 hour at about 60° C. The reaction product was then suction-filtered, washed with water until free from sodium chloride and dried.

Yield: 15.33 kg.=98% of the theoretical.

*Analysis.*—Calculated (percent): Sn, 50.1; S, 13.5. Found (percent): Sn, 49.6; S, 13.3.

By extracting the mixture of organotin compounds with chloroform in a Soxhlet, the chloroform-soluble butyl-thiostannonic acid could be separated from the insoluble bis-monobutyltin adipinate.

200 grams of mixture thus yielded 122 grams of butyl-thiostannonic acid and 72 grams bi-monobutyltin adipinate, which corresponded to a ratio of 1.7:1.

The mixing ratio between butylthiostannonic acid and bis-monobutyltin adipinate may be varied by correspondingly varying the amounts of sodium sulfide or sodium adipinate and sodium hydroxide solution used for the reaction.

Instead of adipic acid, it is also possible to use other dicarboxylic acids, for example, maleic acid, sebacic acid or phthalic acid.

EXAMPLE 3

Reaction of butyltin trichloride with sodium sulfide, potassium oleate and potassium hydroxide (potassium hydroxide solution)

*Reaction schemes:*

$$4C_4H_9SnCl_3 + 6Na_2S \longrightarrow 4C_4H_9SnS_{1.5} + 12NaCl$$
$$C_4H_9SnCl_3 + C_{17}H_{33}-COOK + 2KOH \longrightarrow$$

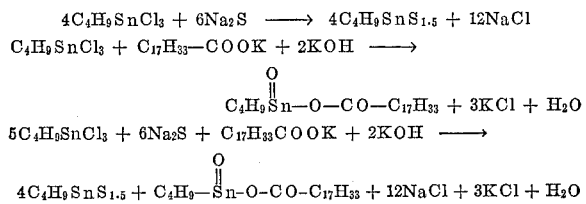

$$5C_4H_9SnCl_3 + 6Na_2S + C_{17}H_{33}COOK + 2KOH \longrightarrow$$
$$4C_4H_9SnS_{1.5} + C_4H_9-\overset{O}{\overset{\|}{S}}n-O-CO-C_{17}H_{33} + 12NaCl + 3KCl + H_2O$$

To a mixture of 28.2 grams of oleic acid (0.1 mole) and 500 cc. of water a solution of 16.8 grams of potassium hydroxide (0.3 mole) in 100 cc. of water was added, while stirring, in a glass flask. The oleic acid dissolved as potassium oleate. 144 grams of $Na_2S \cdot 9H_2O$ (0.6 mole) and 300 cc. of water were added, while stirring continuously, and a solution of 141.1 grams of butyltin trichloride (0.5 mole) in 800 cc. of water was then slowly run in. The temperature rose from 25° C. to 32° C. and the mixture of organotin compounds precipitated in the form of a white powder. Stirring was continued for 3 hours at about 40° C. The product was then suction-filtered, washed with water until free from sodium chloride and dried.

Yield: 135.7 g.=99.3% of the theoretical.

*Analysis.*—Calculated (percent): Sn, 43.4; S, 14.0. Found (percent): Sn, 43.2; S, 13.6.

The ratio of sulfur-containing stabilizer component to stabilizer component free from sulfur was 1.9:1.

Instead of oleic acid, it is also possible to use stearic acid, ricinoleic acid or hydroxystearic acid.

When, instead of oleic acid, 28.4 grams of stearic acid (0.1 mole) were used, a yield of 132 g. (=96.4% of the theoretical) was obtained.

*Analysis.*—Calculated (percent): Sn, 43.3; S, 14.0. Found (percent): Sn, 43.4; S, 13.6.

When, instead of oleic acid, 29.8 grams of ricinoleic acid (0.1 mole) were used, a yield of 135.9 grams (=98.1% of the theoretical) was obtained.

*Analysis.*—Calculated (percent): Sn, 42.8; S, 13.9. Found (percent): Sn, 42.9; S, 13.4.

By using, instead of oleic acid, 30 grams of hydroxystearic acid (0.1 mole), a yield of 138 grams (=99.6% of the theoretical) was obtained.

*Analysis.*—Calculated (percent): Sn, 42.8; S, 13.9. Found (percent): Sn, 42.8; S, 13.3.

All substances were obtained in the form of a fine white powder.

EXAMPLE 4

Reaction of butyltin trichloride with sodium sulfide, sodium citrate and sodium hydroxide solution

*Reaction schemes:*

$$8C_4H_9SnCl_3 + 12Na_2S \longrightarrow 8C_4H_9SnS_{1.5} + 24NaCl$$

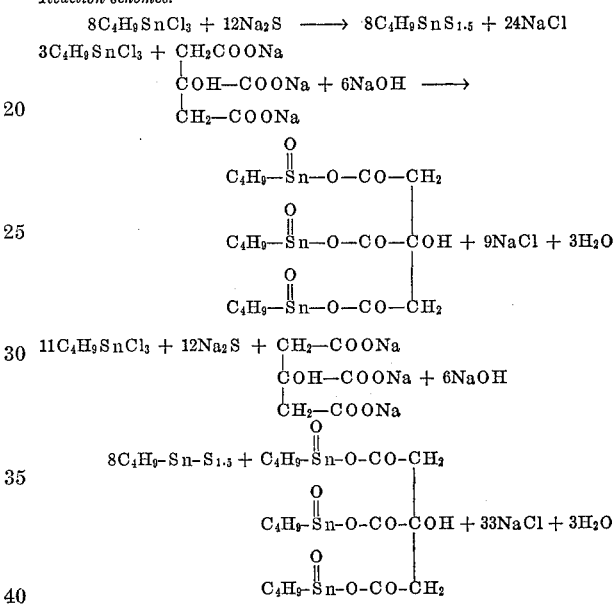

In a glass flask 19.2 grams of citric acid (0.1 mole) were stirred with 200 cc. of water and 450 cc. of a 2 N solution of sodium hydroxide (0.9 mole). Then a solution of 288 grams of $Na_2S \cdot 9H_2O$ (1.2 moles) in 500 cc. of water was added and into the clear mixture so obtained a solution of 310.4 grams of butyltin trichloride (1.1 moles) in 1400 cc. of water was run. While the temperature rose from 25° to 37° C. the mixture of organotin compounds precipitated in the form of a white powder. Stirring was continued for some time at 40° C. The reaction product was then suction-filtered, washed with water until free from sodium chloride and dried. The yield was 237 grams (=92.8% of the theoretical).

*Analysis.*—Calculated (percent): Sn, 51.1; S, 15.0. Found (percent): Sn, 51.8, S, 15.3.

The ratio of sulfur-containing stabilizer component to stabilizer component free from sulfur was 2.3:1.

EXAMPLE 5

100 parts of a polyvinyl chloride obtained by suspension polymerization and having a K value of 60, were mixed at 180° C. on mixing rolls with 0.5 part of a lubricant based on montan wax and 0.2, 0.5 and 1 part, respectively, of one of the organotin compounds set forth under the following items (a) to (h):

(a) dioctyltin dioctyl thioglycolate (comparison)
(b) butylthiostannonic acid (comparison)
(c) organotin product according to Example 1 (according to the invention)
(d) organotin product according to Example 3 (oleate) (according to the invention)
(e) organotin product according to Example 2 (according to the invention)

(f) organotin product according to Example 3 (stearate) (according to the invention)
(g) organotin product according to Example 3 (ricinoleate) (according to the invention)
(h) organotin product according to Example 4 (according to the invention).

After rolling for 5 minutes, samples were taken and the discolorations which had occurred were noted. The end of each rolling test (maximum heat stability) was reached when the polyvinyl chloride mixture stuck to the roll. The test results are indicated in the following Table 1.

TABLE 1

| Stabilizer | Almost colourless up to (min.) | Sticks after (min.) |
|---|---|---|
| 0.2 part by weight: | | |
| (a)[1] | 5 | 32 |
| (b)[1] | 20 | 34 |
| (c) | 25 | 38 |
| (d) | 25 | 36 |
| (e) | 20 | 38 |
| (f) | 25 | 36 |
| (g) | 25 | 36 |
| (h) | 25 | 38 |
| 0.5 part by weight: | | |
| (a)[1] | 5 | 44 |
| (b)[1] | 15 | 44 |
| (c) | 15 | 60 |
| (d) | 15 | 54 |
| (e) | 25 | 68 |
| (f) | 15 | 52 |
| (g) | 20 | 57 |
| (h) | 20 | 61 |
| 1 part by weight: | | |
| (a)[1] | 10 | 60 |
| (b)[1] | 15 | 76 |
| (c) | 20 | 100 |
| (d) | 25 | 84 |
| (e) | 25 | (²) |
| (f) | 20 | 93 |
| (g) | 20 | 72 |
| (h) | 20 | 108 |

[1] For comparison.
[2] Not after 120 min.

The above table shows that with all three proportions of stabilizer the polyvinyl chloride mixtures containing the organotin stabilizers in accordance with the invention were discolored more slowly and had a better heat stability than the mixtures obtained with the known stabilizers dioctyltin dioctyl thioglycolate and butylthiostannonic acid. The higher the amount of stabilizer in the mixture, the more pronounced the effect.

EXAMPLE 6

100 parts of a suspension polyvinyl chloride having a K value of 60 were mixed at 180° C. on mixing rolls with 0.4 part of a lubricant based on montan wax, 0.35 part of an antioxidant based on phosphite (tri-p-nonylphenyl phosphite) and 0.25 part of an antioxidant based on a substituted phenol (di-tert.butyl-p-cresol) and in each case with 0.6 part of one of the organotin compounds enumerated sub (b) to (h) in Example 5. After rolling for 5 minutes in each case, samples were taken and the discolorations which occurred were observed. The test results are indicated in the following Table 2.

TABLE 2

| Stabilizer | Almost colourless up to (min.) |
|---|---|
| (b) (for comparison) | 25 |
| (c) | 45 |
| (d) | 50 |
| (e) | 55 |
| (f) | 55 |
| (g) | 50 |
| (h) | 45 |

Table 2 shows that the mixture stabilized with butylthiostannonic acid began to discolor after 25 minutes already. After 40 minutes the mixture had turned brown. In contradistinction thereto, the mixtures treated with the organotin stabilizers in accordance with the invention remained almost colourless for 45 to 55 minutes.

EXAMPLE 7

100 parts of a suspension polyvinyl chloride were mixed at 175° C. on mixing rolls with 45 parts of dioctyl phthalate, 1 part of a lubricant based on montan wax and in each case with 0.2 part of one of substances (a), (b) and (d) enumerated in Example 5. After rolling for 5 minutes in each case, samples were taken and the discolorations which occurred were observed. When the mixture of polyvinyl chloride stuck to the rolls, the tests were terminated. The discolorations observed are indicated in the following Table 3.

TABLE 3

| Stabilizer | Colourless up to (min.) | Sticks after (min.) |
|---|---|---|
| (a)[1] | 5 | 5 |
| (b)[1] | 50 | 78 |
| (d) | 60 | 80 |

[1] For comparison.

Table 3 shows that stabilizer (b) (butylthiostannonic acid) had a better effect under the indicated conditions than stabilizer (a) (dioctyltin dioctyl thioglycolate) but was still inferior to stabilizer (d) obtained as described in Example 3.

EXAMPLE 8

100 parts of a suspension copolymer of vinyl chloride and vinyl acetate (weight ratio 90:10) of a K value of 60 were mixed at 170° C. on mixing rolls with 1 part of a lubricant based on montan wax and in each case with 0.2 and 0.5 part, respectively, of one of organotin compounds (a), (b) and (c) listed in Example 5. After rolling for 5 minutes in each case, samples were taken and the discolorations which occurred were observed. The test results are indicated in the following Table 4.

TABLE 4

| Stabilizer | almost colourless up to (min.) | reddish brown up to (min.) |
|---|---|---|
| 0.2 part by weight: | | |
| (a)[1] For | 5 | 10 |
| (b)[1] comparison | 10 | 20 |
| (c)[1] comparison | 15 | 20 |
| 0.5 part by weight: | | |
| (a)[1] | 10 | 20 |
| (b)[1] | 10 | 30 |
| (c) | 15 | 30 |

[1] For comparison.

Table 4 shows that, when a copolymer was used, stabilizer (b) had a better effect than stabilizer (a) and that stabilizer (c) of Example 1 was even somewhat superior to stabilizer (b).

EXAMPLE 9

100 parts of a polyvinyl chloride having a K value of 55, obtained by mass polymerization, were mixed at 180° C. on mixing rolls with 1.0 part of a lubricant based on montan wax, 0.2 part of an antioxidant based on an alkyl thioether (dilauryl thiodipropionate), 0.2 part of an antioxidant based on phosphite (tri-p-nonylphenyl phosphite) and in each case with 0.3 part of one of organotin compounds (a), (b) and (g) enumerated in Example 5. The heat stabilities obtained are indicated in the following Table 5.

TABLE 5

| Stabilizer: | Almost colourless up to (min.) |
|---|---|
| (a) (for comparison) | 5 |
| (b) (for comparison) | 10 |
| (g) | 15 |

The above Table 5 shows that stabilizer (g) described in Example 3 had a better stabilizing effect than stabilizer (a) (dioctyltin dioctyl thioglycolate). Stabilizer (b) (butylthiostannonic acid) did not quite reach the long lasting stabilizing effect of (a) and (g) but had a better initial stabilizing effect than (a).

What is claimed is:

1. A molding composition based on vinyl chloride polymers and containing about .05–5% by weight of a stabilizing mixture consisting essentially of:

(a) an organotin compound of the formula $$(RSnS_{1.5})_n$$

in which:
R is an aliphatic, cycloaliphatic, araliphatic or aromatic hydrocarbon having 1–20 carbon atoms, and
$n$ is a whole number of 2–8; and (b) the anhydride of a single sulfur-free stannonic acid of the formula

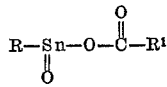

wherein R is as defined above and $R^1$ is the organic radical of a monocarboxylic acid or the radical of a polycarboxylic acid having the carboxylic groups thereof saturated with

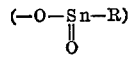

residues, said mono- and polycarboxylic acids having 1 to 20 carbon atoms, or corresponding substituted acid having as substituent a member selected from the group consisting of hydroxyl and amino groups, the ratio of (a) to (b) components being 1–10:10–1.

2. The composition of claim 1 additionally containing an active amount of an antioxidant selected from the group consisting of a phosphoric acid ester, a phenol and an alkyl thioester.

3. The composition of claim 1, comprising 0.2 to 2 percent by weight, calculated on the composition, of the mixture of components (a) and (b) as a stabilizer.

4. The composition of claim 1, wherein the sulfur-containing organotin compound (a) is butylthiostannonic acid.

5. The composition of claim 1, wherein the ratio by weight of component (a) to component (b) is from 6:1 to 2:1.

6. The composition of claim 2 containing as antioxidants tri-(p-nonylphenyl)-phosphite and di-tert, butyl-p-cresol.

7. The composition of claim 2, containing as antioxidants tri-(p-nonylphenyl)-phosphite and di-lauryl-thiodipropionate.

References Cited

UNITED STATES PATENTS

| 2,628,211 | 2/1953 | Mack | 260—45.75 |
| 2,763,632 | 9/1956 | Johnson | 260—45.75 |
| 3,021,302 | 2/1962 | Frey | 260—45.75 |
| 3,198,757 | 8/1965 | Ricciordi et al. | 260—2.5 |
| 3,213,119 | 10/1965 | Wilson | 260—429.7 |
| 3,413,264 | 11/1968 | Hechenbleikner et al. | 260—45.75 |

DONALD E. CZAJA, Primary Examiner
V. P. HOKE, Assistant Examiner

U.S. Cl. X.R.
260—45.7, 45.85, 45.95, 414, 429.7